Patented Jan. 15, 1935

UNITED STATES PATENT OFFICE 1,988,031

METHOD OF RECOVERING CAROTENE

Harold M. Barnett, Mayfield Heights, Ohio, assignor to S. M. A. Corporation, Cleveland, Ohio, a corporation of Ohio No Drawing. Application September 30, 1933, Serial No. 691,693

13 Claims. (Cl. 260—167)

This invention relates to a method of isolating carotene and other plant pigments having similar solubility characteristics from plant materials with improved yields and, more particularly, to a method of separating carotene from oils or fats and other substances by the use of a novel precipitating agent.

The natural pigment substance, carotene, is of growing importance as a source of vitamin A, the anti-infective vitamin. Since the pigment exists in small proportion in the natural sources from which it is derived, it is necessary to remove the carotene from accompanying matter so as to present it in concentrated or comparatively concentrated form for administration to the user. Common methods for thus preparing the carotene in concentrated form involve the extraction of the pigment from plant materials along with fats and other substances by the use of various organic solvents. Subsequent evaporation of most of the solvent used causes some of the carotene to crystallize and it may be recovered in this form. The crystalline carotene thus produced may then be redissolved, although with difficulty, in various solvent mediums for administration. By complete removal of the solvent from the plant extract, an oily solution of carotene remains, in addition to the crystalline product which has separated out, and it is extremely difficult to isolate the pigment thus remaining in solution. The proportion of carotene thus staying in solution and being recoverable with difficulty is variable and depends on such factors as the plant material used as a source, the carotene content thereof, the solvent used, the temperature, and the time allowed for crystallization, etc. Usually it is an appreciable proportion of the total carotene present in the solvent extract and, since large quantities of raw material must be treated to secure appreciable quantities of carotene, the proportion of pigment in carrot powder, for example, being 0.5%, the residual difficulty recoverable carotene assumes great importance as affecting the yield and consequent cost of the product.

As a specific example of the methods now employed in recovering carotene, the extraction of carrots may be considered. Dried carrot powder is extracted with petroleum ether, the extract then evaporated and about one-half of the carotene precipitated in the crystalline form. The other half of the carotene remains dissolved in the carrot oil which was extracted from the powder by the solvent and only one method, which is long and involves saponification of the oil, is known for obtaining crystalline carotene from this residual carrot oil. In order to obtain as large a yield as possible of crystalline carotene from the batch of plant material treated, a simple method for precipitating an appreciable portion of the carotene from the residual oily plant extract is obviously desirable.

It is, accordingly, an object of the present invention to provide a method of obtaining increased yields of carotene from plant materials and oils containing this pigment. Another object of the invention is to provide a method of recovering important amounts of carotene from the residual oily solution remaining after an organic solvent extract containing carotene has been evaporated down to precipitate all of the crystalline carotene which will come out in this manner. Still another object of the invention is to provide a method of directly isolating carotene from natural oils comparatively rich in this substance.

In pursuing investigation of the possibilities of recovering carotene from the residual extract mentioned above, it has been found that some of the lower alcohols, such as the aliphatic monohydric alcohols, have the property of mixing with oils and precipitating from them a large proportion of their carotene content. An example of such a precipitating agent is normal propyl alcohol, by the use of which as high as 60% of the carotene in carrot oil has been precipitated in crystalline form. Other alcohols which have been found useful for this purpose are butyl and amyl alcohols which precipitate carotene under the conditions described but in yields which are not as great as those obtained by the use of propyl alcohol.

Other related alcohols may also be used to obtain practicable yields but methyl and ethyl alcohols are not useful for the purpose since they are not miscible with oils. For purposes of illustration, an example of the new method for increasing the yield of crystalline carotene from plant materials is given as follows: Carrot powder, which has been carefully prepared so as to exclude dirt and preserve as much of the original color, due chiefly to carotene, as possible, is extracted in large percolators with petroleum ether having a boiling range of 40–60° C. The carrot powder should be ground as fine as will permit slow extraction by gravity and no particles should be larger than 50 mesh. Petroleum ether equal in weight to twice that of the carrot powder to be extracted is required. After the petroleum ether has percolated through the carrot powder, the extract, which contains the carotene along with carrot oil and certain waxy materials, is then concentrated to about 2% of the original volume and allowed to stand about one week, during which time about one-half of the carotene crystallizes out. The crystalline carotene is removed by filtration, or other suitable means, and washed with petroleum ether. The residual oil, containing some solvent, also contains the remaining half of the carotene and this has heretofore been recoverable only by saponification of the oil, a difficult and cumbersome procedure.

According to the present process, this residue is further evaporated to remove the remainder of the petroleum ether, or other solvent used for the extraction, taking precautions during the last stages of the evaporation to prevent decomposition of the carotene which is extremely susceptible to oxidation. These precautions should include the use of vacuum, inert gas, and careful temperature regulation. The carrot oil remaining after the completion of the evaporation, is deep red in color, due to its high carotene content, ranging from 1.5 to 3.0%. This is a much higher carotene content than can be obtained by dissolving crystalline carotene in common vegetable oils, the higher concentration being thought to depend on the presence of certain fat-soluble materials in the carrot which increase the solubility of carotene but which are separated when the crystalline pigment is prepared. To this carrot oil is added several volumes of propyl alcohol, one or two volumes causing a considerable quantity of the carotene to precipitate but higher yields being obtainable through the use of from six to eight volumes of the precipitant. The mixture is allowed to stand for a week or so as the carotene is rather slow to crystallize. In this way about 60% of the carotene in the residual carrot oil may be precipitated in the crystalline form. The carotene is contaminated to a greater or lesser degree with waxy materials, but these may be largely removed by washing the carotene with petroleum ether. Assuming that 50% of the carotene crystallizes out upon evaporation of the petroleum ether before the alcohol treatment, then isolation of 60% of the half remaining in the oil results in an increased yield to the extent of about 30%. Consequently, about 80% of the total carotene in the original extract is recovered by the combined treatments. Since most of the propyl alcohol may be recovered from the carrot oil, the cost of the extra operation is not great, especially when compared with the large increase in yield of the valuable crystalline carotene.

While the foregoing example applies the method of the invention to the production of crystalline carotene from carrots, it will be obvious that the method is also applicable to the recovery of carotene from other vegetable oils rich in carotene, such as the oily extracts from spinach and alfalfa. The process is also applicable to the precipitation of crystalline carotene from concentrated extracts of other oils, such as a deep red extract of palm oil. Normal propyl alcohol has been found to be the most efficient precipitating agent for the purposes of the invention but other lower aliphatic alcohols have also been found useful in degree, including butyl and amyl alcohols. Still other lower alcohols may also be found useful provided they are miscible with oils but excluding methyl and ethyl alcohols which are not thus miscible with oils and fats, but it is preferred to use an alcohol having from three to five carbon atoms in the molecule. The pigment lycopin, which is isomeric with carotene, may also be precipitated from its solutions by the foregoing method.

What I claim is:

1. A method of recovering carotene from carrot oil which comprises adding several volumes of normal propyl alcohol to the carrot oil and letting the mixture stand to precipitate crystalline carotene.

2. A method of recovering carotene from carrot oil which comprises adding about 2 to 8 volumes of normal propyl alcohol to the carrot oil and letting the mixture stand to precipitate crystalline carotene.

3. A method of recovering carotene from plant materials containing the same which comprises extracting the powdered material with an organic solvent, concentrating the extract, crystallizing out a portion of the carotene, treating the oily residue with a lower monohydric aliphatic alcohol miscible with the oil and recovering an additional quantity of carotene.

4. A method of recovering carotene from carrots which comprises extracting carrot powder with petroleum ether, concentrating the extract, crystallizing out a portion of the carotene, removing the remainder of the solvent, treating the oily residue with normal propyl alcohol and recovering an additional quantity of crystalline carotene.

5. A method of recovering carotene from natural oils containing the same which comprises concentrating the oil with respect to its carotene content, adding a lower monohydric aliphatic alcohol miscible with the natural oil thereto, and precipitating crystalline carotene.

6. A method of recovering carotene from a concentrated oily or fatty solution thereof, which comprises adding a lower monohydric alcohol above ethyl alcohol in the aliphatic series to the oily or fatty solution to precipitate carotene.

7. A method of recovering carotene in solid form from a concentrated oily or fatty solution thereof, which comprises adding aliphatic alcohol having more than two carbon atoms in the molecule to the oily or fatty solution to precipitate carotene.

8. A method of recovering carotene in crystalline form from a concentrated oily solution thereof, which comprises adding alcohol having from three to five carbon atoms in the molecule to the oily solution to precipitate crystalline carotene.

9. A method of recovering carotene from a concentrated oily or fatty solution thereof, which comprises adding propyl alcohol to the oily solution to precipitate the carotene.

10. A method of recovering carotene from a concentrated oily or fatty solution thereof, which comprises adding a lower monohydric aliphatic alcohol, miscible with the oil or fat, to the solution to precipitate carotene.

11. A method of recovering carotene from a concentrated oily or fatty solution thereof, which comprises adding butyl alcohol to the oily solution to precipitate the carotene.

12. A method of recovering carotene from a concentrated oily or fatty solution thereof, which comprises adding amyl alcohol to the oily solution to precipitate the carotene.

13. A method of recovering a pigment isomeric with carotene from a concentrated oily or fatty solution thereof, which comprises adding a lower monohydric alcohol above ethyl alcohol in the aliphatic series to the oily or fatty solution to precipitate the pigment.

HAROLD M. BARNETT.